(12) United States Patent
Ito et al.

(10) Patent No.: US 11,141,695 B2
(45) Date of Patent: Oct. 12, 2021

(54) GAS TURBINE

(71) Applicant: IHI Corporation, Tokyo (JP)

(72) Inventors: Shintaro Ito, Tokyo (JP); Soichiro Kato, Tokyo (JP); Masahiro Uchida, Tokyo (JP); Shogo Onishi, Tokyo (JP); Taku Mizutani, Tokyo (JP); Tsukasa Saitou, Tokyo (JP); Toshiro Fujimori, Tokyo (JP)

(73) Assignee: IHI CORPORATION, Tokyo (JP)

( * ) Notice: Subject to any disclaimer, the term of this patent is extended or adjusted under 35 U.S.C. 154(b) by 133 days.

(21) Appl. No.: 16/574,777

(22) Filed: Sep. 18, 2019

(65) Prior Publication Data

US 2020/0023315 A1 Jan. 23, 2020

Related U.S. Application Data

(63) Continuation of application No. PCT/JP2018/011058, filed on Mar. 20, 2018.

(30) Foreign Application Priority Data

Mar. 27, 2017 (JP) .............................. JP2017-061213

(51) Int. Cl.
  *B01D 53/94* (2006.01)
  *F01D 5/18* (2006.01)
  (Continued)

(52) U.S. Cl.
  CPC ......... *B01D 53/9418* (2013.01); *F01D 5/186* (2013.01); *F01D 9/065* (2013.01); *F23R 3/40* (2013.01); *F02C 3/22* (2013.01)

(58) Field of Classification Search
  CPC ........ B01D 2251/11; B01D 2251/2062; B01D 2258/0283; B01D 53/8631; B01D 53/90;
  (Continued)

(56) References Cited

U.S. PATENT DOCUMENTS 4,131,432 A * 12/1978 Sato .................... F01N 13/0097
  422/177
5,122,033 A *  6/1992 Paul ....................... F01D 5/225
  416/96 R
  (Continued)

FOREIGN PATENT DOCUMENTS

EP         3112620 A1    1/2017
JP         02-55835 A    2/1990
  (Continued)

*Primary Examiner* — Jesse S Bogue
(74) *Attorney, Agent, or Firm* — Rothwell, Figg, Ernst & Manbeck, P.C.

(57) ABSTRACT

A gas turbine denitrifies combustion gas by using a denitrification catalyst and ammonia as a reducing agent, the gas turbine includes: a turbine provided with turbine blades, the turbine blades being exposed to the combustion gas reaching a temperature higher than an average value in a temperature distribution of the combustion gas, and a compressor configured to supply the turbine blades with a cooling air and the ammonia, wherein the gas turbine is configured to lower the temperature of the turbine blades by supplying the turbine blades with the ammonia and the cooling air.

11 Claims, 4 Drawing Sheets

(51) Int. Cl.
*F01D 9/06* (2006.01)
*F23R 3/40* (2006.01)
*F02C 3/22* (2006.01)

(58) Field of Classification Search
CPC ..... B01D 53/9418; F01D 5/185; F01D 5/186; F01D 9/041; F01D 9/065; F02C 3/22; F02C 3/24; F02C 3/34; F02C 7/16; F05D 2260/205; F05D 2260/232; F23R 3/40
See application file for complete search history.

(56) References Cited

U.S. PATENT DOCUMENTS

| | | | |
|---|---|---|---|
| 8,220,268 B2* | 7/2012 | Callas | F02C 7/224 |
| | | | 60/736 |
| 8,943,826 B2* | 2/2015 | Kasuga | F01N 3/2066 |
| | | | 60/728 |
| 9,145,849 B2* | 9/2015 | Kasuga | F02C 7/22 |
| 2012/0047870 A1* | 3/2012 | Kasuga | F02C 7/22 |
| | | | 60/39.462 |
| 2020/0032712 A1* | 1/2020 | Ito | F02C 7/141 |

FOREIGN PATENT DOCUMENTS

| | | |
|---|---|---|
| JP | 2001-107703 A | 4/2001 |
| JP | 2014-058979 A | 4/2014 |
| JP | 2015-190466 A | 11/2015 |
| JP | 2016-191507 A | 11/2016 |
| WO | 2010/082360 A1 | 7/2010 |

* cited by examiner

GAS TURBINE

This application is a Continuation application based on International Application No. PCT/JP2018/011058, filed on Mar. 20, 2018, which claims priority on Japanese Patent Application No. 2017-061213, filed on Mar. 27, 2017, the contents of which are incorporated herein by reference.

TECHNICAL FIELD

The present disclosure relates to a gas turbine.

BACKGROUND ART

Patent Document 1 discloses a gas turbine and a combustion apparatus combusting ammonia as a fuel. As for the combustion apparatus and the gas turbine, ammonia (fuel ammonia) is premixed with natural gas, the result of the premixing is supplied to a combustor, and then flue gas driving a turbine is obtained. In addition, a reduction region is formed on the downstream side in the combustor for the purpose of nitrogen oxide (NOx) reduction. In the reduction region, the nitrogen oxide (NOx) that is generated in a combustion region is reduced by means of ammonia for reduction.

CITATION LIST

Patent Literature

[Patent Document 1] Japanese Unexamined Patent Application, First Publication No. 2016-191507

SUMMARY OF INVENTION

Technical Problem

The flue gas (main flow) is rectified into an annular flow via a member (deflection member) deflecting the flow of the flue gas, such as a scroll or a transition piece, and is supplied to a stator vane portion where a plurality of stator vanes are annularly disposed and a rotor blade portion where a plurality of rotor blades are annularly disposed. In other words, in the turbine, the flue gas (combustion gas) acts as a drive fluid on the rotor blade portion via the deflection member and the stator vane portion and the main shaft that is coupled to the rotor blade portion is driven to rotate as a result.

In a case where the inlet temperature distribution of the combustion gas is not uniform at the inlet of the deflection member, the thermal stress in the plurality of stator vanes and rotor blades, which are annularly disposed, becomes non-uniform. In other words, the stress that is applied to the stator vane exposed to combustion gas relatively high in temperature exceeds the stress that is applied to the stator vane exposed to combustion gas relatively low in temperature. In addition, the rotor blade is alternately exposed to the combustion gas relatively high in temperature and the combustion gas relatively low in temperature. Accordingly, the temperature non-uniformity of the combustion gas at the inlet of the deflection member needs to be redressed in that the non-uniformity leads to stator vane portion and rotor blade portion failures, that is, a gas turbine failure.

The present disclosure has been made in view of the above, and an object of the present disclosure is to provide a gas turbine uniformizing the temperature distribution of the combustion gas that acts on a plurality of stator vanes and rotor blades or limiting temperature unevenness.

Solution to Problem

A gas turbine according to a first aspect of the present disclosure denitrifies combustion gas by using a denitrification catalyst and ammonia as a reducing agent. The gas turbine includes: a turbine provided with turbine blades, the turbine blades being exposed to the combustion gas reaching a temperature higher than an average value in a temperature distribution of the combustion gas, and a compressor configured to supply the turbine blades with a cooling air and the ammonia. The gas turbine is configured to lower the temperature of the turbine blades by supplying the turbine blades with the ammonia and the cooling air.

According to a second aspect of the present disclosure, in the first aspect, the gas turbine is configured such that the ammonia supplied to the turbine blades is supplied to a combustor as a fuel after cooling the turbine blades.

According to a third aspect of the present disclosure, in the first aspect, the gas turbine is configured such that the ammonia supplied to the turbine blades is injected into a combustion gas flow path after cooling the turbine blades and is discharged from the turbine after mixing with the combustion gas.

According to a fourth aspect of the present disclosure, in any one of the first to third aspects, the gas turbine is configured such that the ammonia is supplied to the turbine blades in a liquid state.

According to a fifth aspect of the present disclosure, in any one of the first to fourth aspects, the gas turbine is configured such that the ammonia is mixed in advance with the cooling air and is supplied to the turbine blades.

According to a sixth aspect of the present disclosure, in any one of the first to fifth aspects, the gas turbine is configured to generate the combustion gas by combusting the ammonia at least as some of a fuel.

According to a seventh aspect of the present disclosure, in any one of the first to sixth aspects, each of the turbine blades has a flow path of the ammonia in each of the turbine blades.

According to an eighth aspect of the present disclosure, in any one of the first to seventh aspects, each of the turbine blades has a flow path for discharging the ammonia from an inside toward an outside.

Advantageous Effects of Invention

According to the present disclosure, it is possible to provide a gas turbine uniformizing the temperature distribution of the combustion gas that acts on a plurality of stator vanes and rotor blades or limiting temperature unevenness.

DESCRIPTION OF EMBODIMENTS

Hereinafter, an embodiment of the present disclosure will be described with reference to accompanying drawings.

Figure 1:
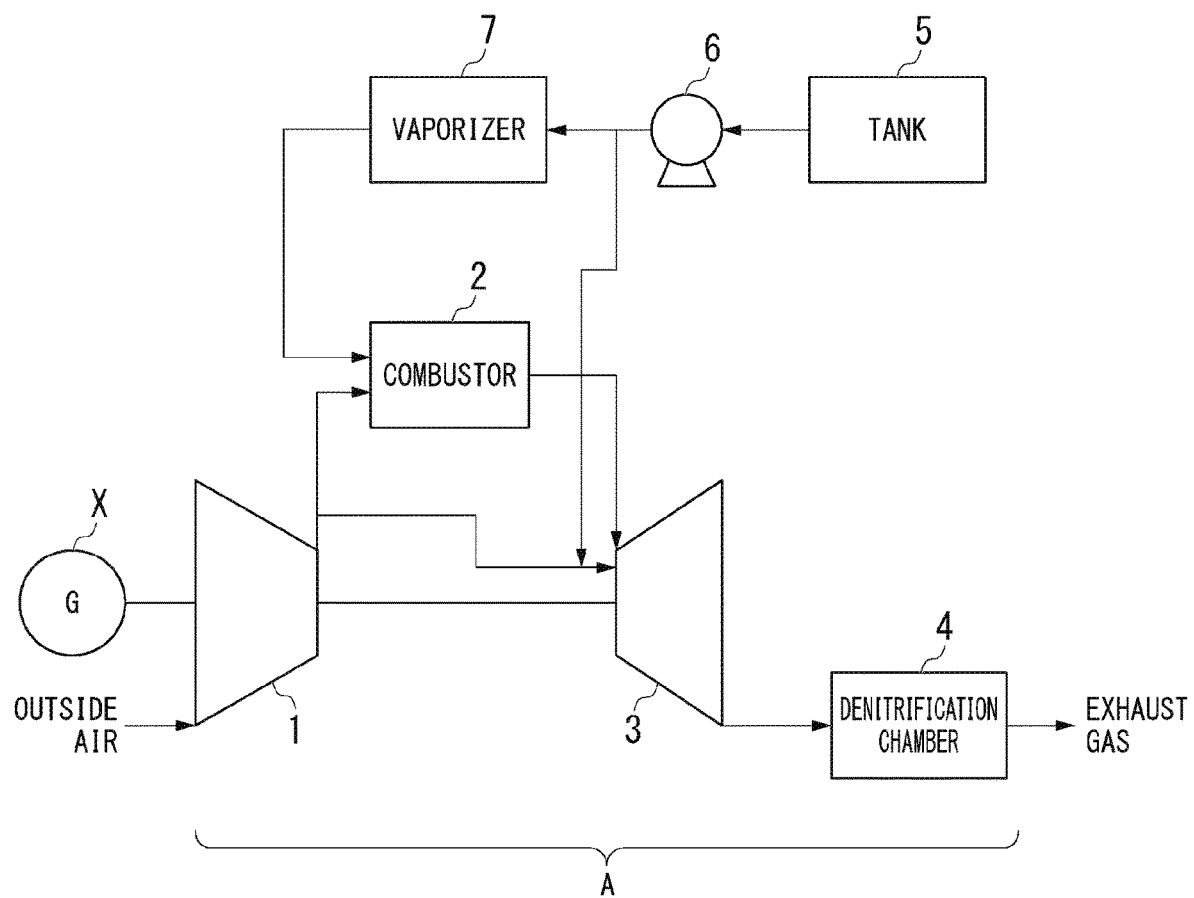
FIG. 1 is a block diagram showing an overall configuration of a gas turbine according to an embodiment of the present disclosure.

A gas turbine A according to the present embodiment is provided with a compressor 1, a combustor 2, a turbine 3, a denitrification chamber 4, a tank 5, a pump 6, and a vaporizer 7 as shown in FIG. 1. The gas turbine A is a drive source of a generator G and generates rotational power by combusting ammonia as a fuel.

The compressor 1 is a multistage axial flow compressor generating compressed air by compressing air taken in from outside air to a predetermined pressure. The compressor 1 supplies some of the compressed air to the combustor 2 as air for combustion and supplies some of the compressed air to the turbine 3 as cooling air. The combustor 2 combusts gaseous ammonia supplied from the vaporizer 7 by using the air for combustion supplied from the compressor 1 as an oxidant and outputs combustion gas to the turbine 3.

The turbine 3 is a multistage axial flow turbine generating rotational power by using the combustion gas as drive gas. As shown, the turbine 3 is axially coupled to the compressor 1 and the generator G The compressor 1 and the generator G are driven to rotate by the rotational power of the turbine 3.

Figure 2:
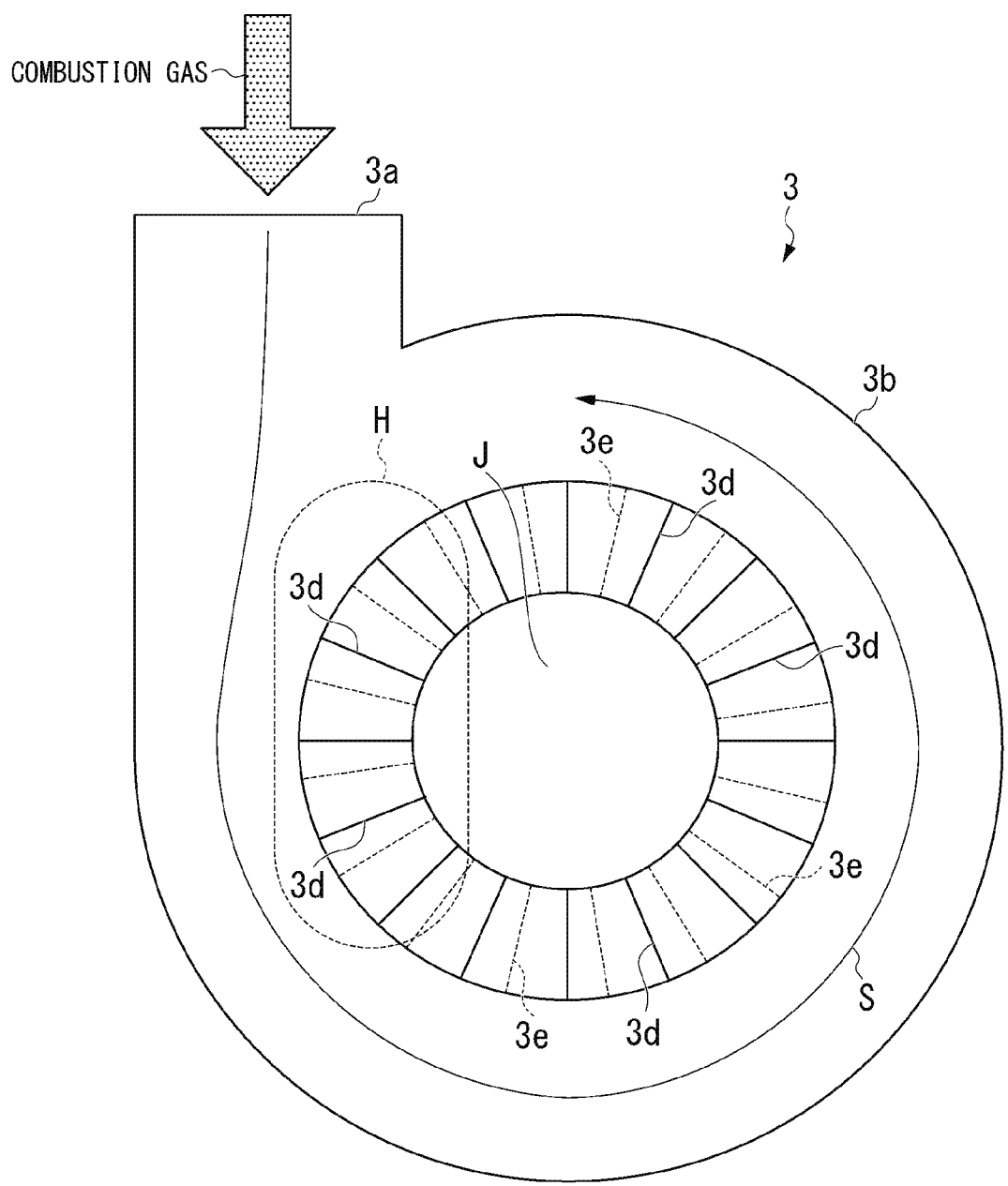
FIG. 2 is a first schematic diagram showing a detailed configuration of a turbine according to an embodiment of the present disclosure.

As shown in FIG. 2, the turbine 3 is provided with an intake port 3a, a scroll flow path 3b, a plurality of stator vanes 3d, and a plurality of rotor blades 3e. The stator vane 3d and the rotor blade 3e are turbine blades in the present disclosure. The intake port 3a is an opening communicating with the combustor 2. The combustion gas is taken into the intake port 3a from the combustor 2. The scroll flow path 3b is in communication with the intake port 3a and rectifies the combustion gas taken in from the intake port 3a into an annular flow S.

The plurality of stator vanes 3d are first-stage fixed blades annularly arranged on the center side of the scroll flow path 3b and constitute a stator vane portion. The plurality of rotor blades 3e are first-stage movable blades disposed on the back side of the drawing with respect to the plurality of stator vanes 3d and constitute a rotor blade portion. Similarly to the plurality of stator vanes 3d, the plurality of rotor blades 3e are annularly arranged with respect to a rotary shaft J positioned at the center of the scroll flow path 3b. The stator vane portion and the rotor blade portion are alternately disposed in multiple stages in the direction in which the rotary shaft J extends (direction perpendicular to the drawing).

Regarding the plurality of stator vanes 3d and rotor blades 3e, sign H in FIG. 2 indicates a high-temperature region into which the combustion gas that has a temperature higher than the average value in the temperature distribution of the combustion gas flows. In other words, the stator vanes 3d that are positioned in the high-temperature region H are exposed to the combustion gas that has a higher-than-average temperature as the temperature distribution of the combustion gas flowing into the intake port 3a is not uniform and the temperature of the combustion gas is higher on the left side in FIG. 2 than on the right side in FIG. 2.

Figure 3:
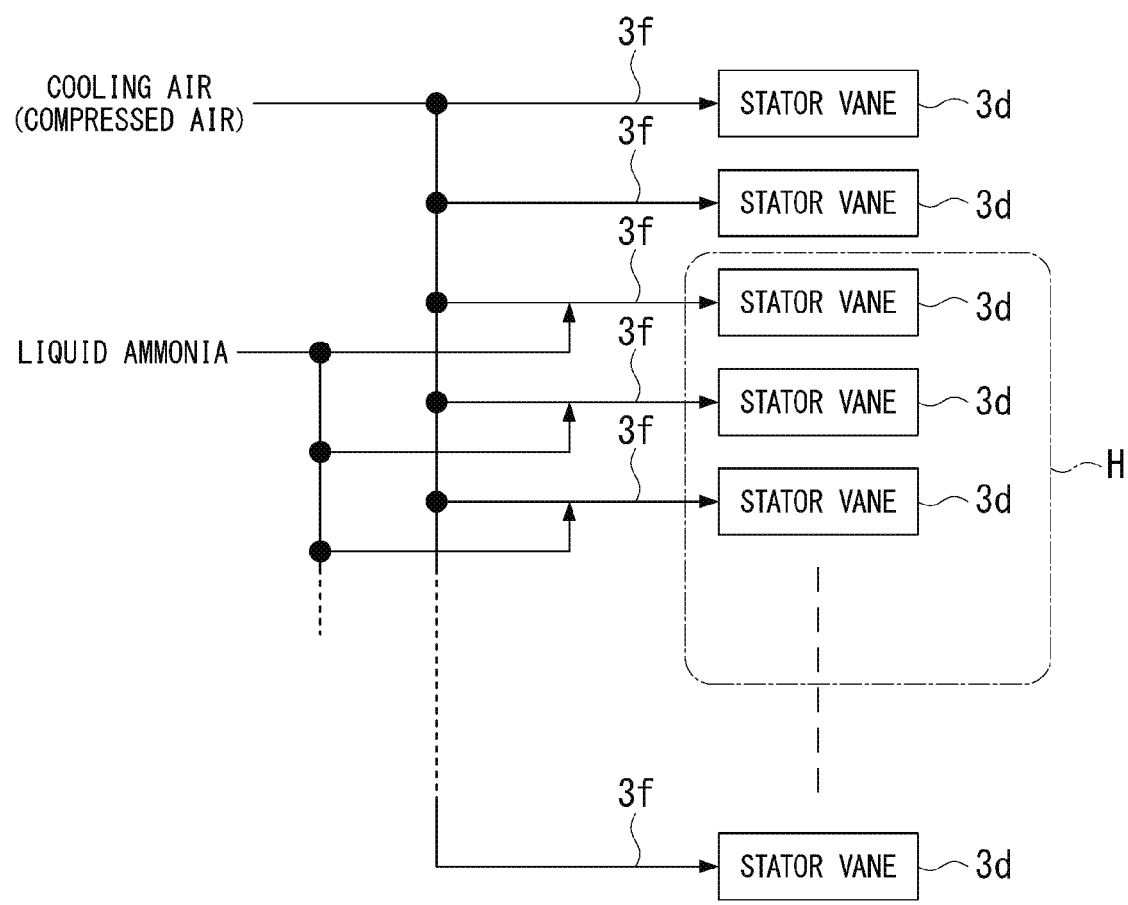
FIG. 3 is a second schematic diagram showing the detailed configuration of the turbine according to an embodiment of the present disclosure.

As shown in FIG. 3, the cooling air (compressed air) that the compressor 1 outputs toward the turbine 3 is distributed and supplied to each stator vane 3d of the turbine 3 via branch flow paths 3f. As shown, liquid ammonia is supplied to the branch flow paths 3f that supply the cooling air to the stator vanes 3d that are positioned in the high-temperature region H. In other words, the branch flow paths 3f that supply the cooling air to the stator vanes 3d that are positioned in the high-temperature region H are liquid ammonia flow paths and the liquid ammonia is supplied to each stator vane 3d after being premixed with the cooling air (compressed air) in the branch flow paths 3f respectively provided in the stage ahead of the stator vanes 3d. Here, the cooling air premixed with the liquid ammonia is referred to as premixed cooling air.

Although the stator vanes 3d are substantially evenly cooled as the cooling air is distributed and supplied to each stator vane 3d, the liquid ammonia functions as a coolant cooling only the stator vanes 3d positioned in the high-temperature region H from the inside. Multiple holes (film cooling holes) are formed in each stator vane 3d so that film cooling is performed on the surface of the stator vane 3d. The liquid ammonia and the cooling air supplied to the stator vanes 3d leak out in part to the surface sides from the inner portions of the stator vanes 3d via the film cooling holes. As a result, the stator vanes 3d are cooled from the surfaces as well.

As a result, the respective surfaces of the stator vanes 3d are substantially evenly cooled by the cooling air and the surfaces of the stator vanes 3d that are positioned in the high-temperature region H are further cooled by the liquid ammonia. Further, the liquid ammonia on the surfaces of the stator vanes 3d is vaporized by the heat of the combustion gas, become gaseous ammonia, and cools the rotor blades 3e that are positioned in the stage behind the stator vanes 3d from the surfaces of the rotor blades 3e. In other words, the rotor blades 3e that pass through the high-temperature region H are effectively cooled by the liquid ammonia. In other words, each stator vane 3d is provided with the film cooling hole (flow path), the liquid ammonia is discharged from the inside of the hole to the outside of the hole, and a gaseous ammonia layer (gas layer) lower in temperature than the combustion gas is formed on the surface of the stator vane 3d.

The turbine 3 discharges post-power recovery combustion gas toward the denitrification chamber 4. The combustion gas discharged from the turbine 3 to the denitrification chamber 4 contains the gaseous ammonia derived from the liquid ammonia injected into the branch flow path 3f. The denitrification chamber 4 is filled with a denitrification catalyst. In the denitrification chamber 4, the nitrogen oxide (NOx) that is contained in the combustion gas is reduced to nitrogen ($N_2$) through denitrification by the gaseous ammonia being used as a reducing agent.

The tank 5 is a fuel tank in which a predetermined amount of liquid ammonia is stored and supplies the liquid ammonia to the pump 6. The pump 6 pressurizes the liquid ammonia supplied from the tank 5 to a predetermined pressure and supplies the liquid ammonia to the vaporizer 7 and the turbine 3. The vaporizer 7 generates gaseous ammonia by vaporizing the liquid ammonia supplied from the pump 6. The vaporizer 7 supplies the combustor 2 with the gaseous ammonia as a fuel (fuel ammonia).

Next, the operation (steady-state operation) of the gas turbine A according to the present embodiment will be described in detail.

In the gas turbine A, liquid ammonia is supplied from the tank 5 to the vaporizer 7 and the turbine 3 by the pump 6 operating. The gaseous ammonia (fuel ammonia) is generated by the liquid ammonia vaporizing in the vaporizer 7, and the liquid ammonia is mixed with the cooling air supplied from the compressor 1 in the turbine 3. The gaseous ammonia (fuel ammonia) generated in the vaporizer 7 is supplied to the combustor 2.

By the compressor 1 operating, compressed air is supplied to the combustor 2 as air for combustion. In the combustor 2, the gaseous ammonia (fuel ammonia) supplied from the vaporizer 7 is combusted by the air for combustion supplied from the compressor 1 being used as an oxidant, and then combustion gas is generated. The combustion gas acts on the turbine 3 as drive gas. As a result, the turbine 3 generates rotational power driving the compressor 1 and the generator G.

The operation of the turbine 3 will be described in further detail below. In the turbine 3, the combustion gas supplied from the combustor 2 flows into the scroll flow path 3b from the intake port 3a and becomes the annular flow S as a result. Then, the combustion gas passes between the plurality of stator vanes 3d annularly disposed inside the scroll flow path 3b and is sprayed onto the plurality of rotor blades 3e, which are adjacent to the plurality of stator vanes 3d and annularly disposed similarly to the plurality of stator vanes 3d. As a result, rotational power is generated in the rotary shaft J.

In other words, the combustion gas enters the plurality of gaps that are radially formed between the plurality of stator vanes 3d that are annularly disposed and passes between the plurality of stator vanes 3d and the plurality of stator vanes 3d provided in multiple stages. In the meantime, the combustion gas generates rotational power in the rotary shaft J. The plurality of stator vanes 3d are fixed blades, and thus the plurality of stator vanes 3d are exposed to a temperature environment in accordance with the temperature distribution of the combustion gas at the intake port 3a.

For example, the high-temperature region H is generated inside the scroll flow path 3b and in the vicinity of the inlet of the scroll flow path 3b as shown in FIG. 2 in a case where the temperature of the combustion gas in the region that corresponds to the inside of the scroll flow path 3b is higher than the temperature of the combustion gas in the other region regarding the combustion gas that has flowed into the intake port 3a from the combustor 2. The temperature to which the stator vanes 3d positioned in the high-temperature region H are exposed is higher than the temperature to which the other stator vanes 3d are exposed. The plurality of rotor blades 3e, which rotate, are alternately exposed to the combustion gas that is relatively high in temperature and the combustion gas that is relatively low in temperature.

It is possible to specify the position of the high-temperature region H by measuring the temperature distribution of the combustion gas at the intake port 3a in advance. In the turbine 3 in the present embodiment, the high-temperature region H is specified by the temperature distribution of the combustion gas being measured in advance and liquid ammonia is selectively supplied as a result to the branch flow paths 3f supplying cooling air to the stator vanes 3d exposed to the high-temperature region H. By means of the liquid ammonia, the cooling capacity of the stator vanes 3d in the high-temperature region H is improved as compared with the cooling capacity of the other stator vanes 3d.

In the denitrification chamber 4 provided in the stage behind the turbine 3, the nitrogen oxide (NOx) that is contained in the combustion gas is removed from the combustion gas by the gaseous ammonia that is contained in the premixed cooling air functioning as a reducing agent. In other words, the gaseous ammonia that contributed to the cooling of the stator vanes 3d exposed to the high-temperature region H functions as a reducing agent in the denitrification chamber 4 and is used for nitrogen oxide (NOx) removal.

In the gas turbine A according to the present embodiment, the temperature distribution of the combustion gas that acts on the plurality of stator vanes 3d and rotor blades 3e can be uniformized or temperature unevenness can be limited. As a result, it is possible to limit a decrease in the service life of the turbine 3.

In the premixed cooling air, the liquid ammonia supplied from the pump 6 is mixed with the cooling air output from the compressor 1. As is known, the specific heat of ammonia is 3.0 kJ/(K·kg) and the specific heat of air is 1.1 kJ/(K·kg). Since the specific heat of ammonia significantly exceeds the specific heat of air, the premixed cooling air is unlikely to fall behind the cooling air alone in terms of cooling capacity in the case of reception of the same energy.

The cooling air supplied from the compressor 1 to the turbine 3 is compressed air, and thus the temperature of the cooling air is higher than an ordinary temperature. In contrast, the temperature of the liquid ammonia is significantly lower than the temperature of the cooling air. In other words, the temperature of the premixed cooling air is lower than the temperature of the cooling air alone, and thus it is possible to improve the cooling efficiency of the turbine 3 by mixing the liquid ammonia with the cooling air.

At an atmospheric temperature of 15° C. and a cooling air pressure of 12 atm, for example, the temperature of the cooling air is approximately 390° C., still, the liquid ammonia has a temperature of 100° C. or less even after pressurization to, for example, 20 atm. Accordingly, it is possible to reliably improve the cooling efficiency of the turbine 3 by mixing the liquid ammonia with the cooling air.

In the gas turbine A according to the present embodiment, the premixed cooling air is obtained by the liquid ammonia output from the pump 6, not the gaseous ammonia output from the vaporizer 7, being mixed with the cooling air. In other words, in the gas turbine A, the cooling air is cooled by the heat of vaporization at a time when the liquid ammonia is mixed with the cooling air and evaporated. Accordingly, in the gas turbine A, the stator vanes 3d in the high-temperature region H can be more effectively cooled than in a case where gaseous ammonia is mixed with cooling air as the premixed cooling air resulting from the mixing of the liquid ammonia with the cooling air is adopted.

Although the premixed cooling air has a risk of backfiring, the ammonia has an extremely small risk of backfiring as the rate of combustion of the ammonia is lower than the rates of combustion of general hydrocarbon-based fuels such as natural gas.

The present disclosure is not limited to the embodiment described above. For example, the following modification examples are conceivable.

(1) In the embodiment described above, the premixed cooling air is injected into the stator vanes 3d provided in the region where the temperature of the combustion gas is relatively high (high-temperature region H). The present disclosure is not limited thereto. If necessary, the premixed cooling air may be individually injected into any stator vane 3d.

(2) In the embodiment described above, the premixed cooling air is generated by the liquid ammonia being mixed with the cooling air. The present disclosure is not limited thereto. If necessary, the premixed cooling air may be generated by gaseous ammonia being mixed with the cooling air.

(3) The gas turbine A using gaseous ammonia as a fuel has been described in the embodiment described above. The present disclosure is not limited thereto. A hydrocarbon other than the gaseous ammonia may be used as a fuel or a hydrocarbon and ammonia may be used as fuels.

(4) Although the liquid ammonia is injected into the branch flow paths 3f in the embodiment described above, ammonia is corrosive to metals and, as such, it is preferable to use a metal material corrosion-resistant to ammonia for the combustion gas flow paths behind the branch flow paths 3f.

Although it has been described that the risk of backfiring is extremely small despite the use of the premixed cooling air, a sensor (thermometer) for backfiring detection may be provided in the scroll flow path 3b if necessary.

Figure 4:
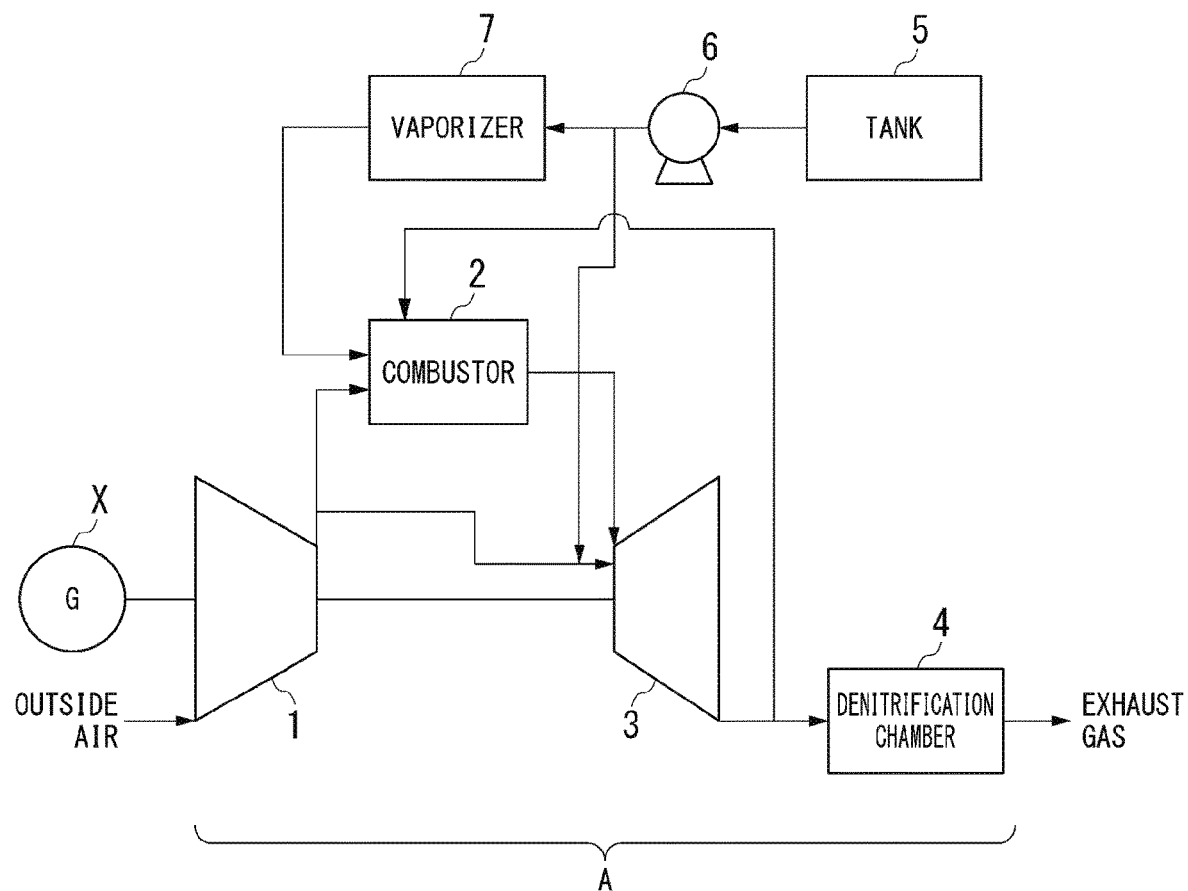
FIG. 4 is a block diagram showing an overall configuration of a gas turbine according to an embodiment of the present disclosure.

(5) In the embodiment described above, combustion gas is discharged toward the denitrification chamber 4 after power recovery in the turbine 3. Alternatively, the combustor 2 may be supplied with some of the combustion gas power-recovered in the turbine 3 as shown in FIG. 4. In this manner, the gaseous ammonia that is contained in the combustion gas can be reused as the fuel ammonia.

INDUSTRIAL APPLICABILITY

With the gas turbine according to the present disclosure, the temperature distribution of the combustion gas that acts on a plurality of stator vanes and rotor blades can be uniformized or temperature unevenness can be limited.

REFERENCE SIGNS LIST

H High-temperature region
S Annular flow
1 Compressor
2 Combustor
3 Turbine
3a Intake port
3b Scroll flow path
3d Stator vane (turbine blade)
3e Rotor blade (turbine blade)
3f Branch flow path
4 Denitrification chamber
5 Tank
6 Pump
7 Vaporizer

The invention claimed is:

1. A gas turbine denitrifying combustion gas by using a denitrification catalyst and ammonia as a reducing agent, the gas turbine comprising:
   a turbine provided with an intake port, a scroll flow path, a plurality of stator vanes, and a plurality of branch flow paths each arranged to supply a cooling air to a respective one of the stator vanes, and
   a compressor configured to supply the branch flow paths with the cooling air,
   wherein the gas turbine is configured to lower the temperature of part of the stator vanes by selectively supplying part of the branch flow paths communicating with the part of the stator vanes arranged along a circumferential direction of the scroll flow path and exposed to combustion gas having a temperature higher than an average temperature of the combustion gas with the ammonia in a liquid state after being premixed with the cooling air supplied from the compressor, and
   wherein the average temperature of the combustion gas flowing from the intake port into the scroll flow path is specified by measuring a temperature distribution of the combustion gas at the intake port.

2. The gas turbine according to claim 1, wherein the gas turbine is configured such that the ammonia in the liquid state supplied to the part of the stator vanes is supplied to a combustor as a fuel after cooling the part of the stator vanes.

3. The gas turbine according to claim 1, wherein the gas turbine is configured such that the ammonia in the liquid state supplied to the part of the stator vanes is injected into a combustion gas flow path after cooling the part of the stator vanes and is discharged from the turbine after mixing with the combustion gas.

4. The gas turbine according to claim 1, wherein the gas turbine is configured to generate the combustion gas by combusting the ammonia in the liquid state at least as some of a fuel.

5. The gas turbine according to claim 1, wherein each of the stator vanes has a flow path of the ammonia in the liquid state in each of the turbine blades.

6. The gas turbine according to claim 1, wherein each of the stator vanes has a flow path for discharging the ammonia in the liquid state from an inside of each of the stator vanes toward an outside of each of the stator vanes.

7. The gas turbine according to claim 2, wherein the gas turbine is configured to generate the combustion gas by combusting the ammonia in the liquid state at least as some of a fuel.

8. The gas turbine according to claim 3, wherein the gas turbine is configured to generate the combustion gas by combusting the ammonia in the liquid state at least as some of a fuel.

9. The gas turbine according to claim 2, wherein each of the stator vanes has a flow path of the ammonia in the liquid state in each of the stator vanes.

10. The gas turbine according to claim 3, wherein each of the stator vanes has a flow path of the ammonia in the liquid state in each of the stator vanes.

11. The gas turbine according to claim 2, wherein each of the stator vanes has a flow path for discharging the ammonia in the liquid state from an inside of each of the stator vanes toward an outside of each of the stator vanes.

* * * * *